United States Patent Office 3,181,992
Patented May 4, 1965

3,181,992
ANTIMICROBIAL LOWER ALKYL POLYHAL-OGENATED ESTERS OF ACIDS OF 1-6 CARBONS
Raymond J. Michalski, Riverdale, John R. Nelson, Park Forest, and Leonard L. Wolfson, Tinley Park, Ill., assignors to Nalco Chemical Company, Chicago, Ill., a corporation of Delaware
No Drawing. Filed July 11, 1961, Ser. No. 123,120
18 Claims. (Cl. 167—38.6)

This invention concerns the prevention and inhibition of chemical deterioration or spoilage of organic substances due to static microbic attack. With more particularity the present invention is concerned with the preservation of water-dispersible organic compounds which are susceptible to attack by microorganisms due to their ability to be utilized as fermentable nutrients. Specifically, the compositions useful in preventing said deterioration and methods for their use will be discussed.

The chemical break-down of many organic materials due to the degradative action of microorganisms has long been a problem throughout many industries. A major problem exists when these organic substances are stored for considerable periods of time, and may be utilized as nutrients by various microbes. Bacteria, fungi, and yeasts thrive on many kinds of organic matter when the appropriate conditions of temperature, pH and moisture are present. The organic matter is utilized in the life cycle of these microorganisms, and consequently broken down chemically to the point where they can no longer be suitably utilized in any further industrial process. Since these nutrient materials must necessarily be stored sometimes for substanial lengths of time, the industrial user is compelled to protect them from microbiological deterioration. This storage problem is prevalent in almost any industry in wich large volumes of additives must be kept on hand for subsequent incorporation into base products. For example, paper manufacturers store a wide variety of paper additives, portions of which are periodically used when necessary.

This problem of preservation becomes materially worse when organic materials are stored as diluted aqueous solutions or dispersions. This environmental medium enhances static microbic attack, and causes accelerated chemical degradation. Susceptible organic ingredients may be so altered that they can no longer be used. Even if the products are not grossly contaminated, there is always the possibility of partial break-down causing severe odor problems and/or subsequnt finished product contamination. Of course, long storage time increases the probability of complete spoilage of both additives and finished products. An example of a long time storage problem is characterized by the storage of water-based paints for sometimes two or three years before industrial or consumer use.

The types of organic matter which are particularly susceptible to static microbic attack are carbohydrates, proteins, and synthetic organic materials. The paper industry, for example, employs many such materials for coating colors, size solutions, and adhesives. These substances are all capable of fermentation due to microbiological attack. The majority of them are stored as aqueous solutions for ready incorporation into the cellulose fibers. Examples of additives which must be stabilized from chemical degradative microorganism attack are starch, dextrin, glucose, casein, soya protein, animal and fish glues, sodium carboxymethyl cellulose, polyvinyl chloride-butadiene copolymers, polyvinyl acetate latexes, acrylates, and others.

Problems with spoilage in storage are not limited to paint and paper industries but are also prevalent in the plastics, leather, and rubber industries. For example, dispersions of rubber latex are frequently stored for long periods of time and are therefore susceptible to degradation. In addition, many types of organic additives which go to make up the finished plastic or resinous product must necessarily be stored for varying lengths of time. Also to impart the desired finish to many leather products various spoilable organic materials must be incorporated therein during tanning and finishing. These must be stored for ready use, in order to maintain efficient production.

In addition to the many types of problems discussed above, wherein stored organic material may be susceptible to microbiological attack, aqueous inorganic solutions may likewise be rendered partially or wholly useless by microbic utilization. While the inorganic components of the aqueous solutions are not usually themselves susceptible, only very minor organic contaminants are necessary to promote spoilage and odor problems. In some few cases autotrophic type microorganisms cause severe problems even in pure inorganic type solutions.

Various means have been employed to safeguard organic substances from microbiological damage. Among these are heat sterilizaiton and the incorporation of chemical preservatives. In the main, heat sterilization is impractical since either the materials to be protected cannot be readily sterilized thereby, or, if sterilized, cannot be economically or practically kept in a sterile condition. Therefore, the incorporation of various chemical preservative additives has been found to afford the best type of protection from microbiological degradative action. Depending upon the adversity of the conditions of storage, chemical preservatives may be added in varying amounts to protect the nutritive materials later used in the industrial process.

Many chemical preservatives have been employed throughout various industries. Among these are phenolic-type compounds, organomercury compounds, heterocyclic nitrogen compounds, quaternary ammonium compounds, and inorganic salts. Specifically, borax, polychlorinated phenols, phenyl mercuric acetate, copper-8-quinolinolate, copper sulfate, etc., are used.

In many cases, however, the use of known chemical preservatives has not always been entirely successful. Many problems have arisen through their use. Among these are adverse effects of the chemical preservative on the physical and chemical properties of the material to be protected. In addition, these same adverse effects may render the final product undesirable because of contaminant side effects. Also, while many of these preservatives prevent any substantial deterioration of the additive to be protected, they nevertheless present handling difficulties for industrial personnel. These known preservatives sometimes cause problems of toxicity and are sometimes dangerous to the skin and respiratory system of humans.

Many times, the chemical and physical characteristics of some of these chemicals present problems of solubility with the system being treated. Incompatibility with the system causes a wide variety of subsequent problems with regard to the final product itself. Odor problems often times arise due to the inherent nature of the preservative.

A primary shortcoming of the majority of known chemical preservatives is their lack of adaptability to a wide variety of industrial systems. A treatment which proves to be successful in one instance may be unsatisfactory in another. The conditions and procedures used throughout the various industries differ widely as does the particular type of organic material to be preserved. For example, a chemical treatment of a carbohydrate composition may fail completely when applied to a protein or another different type of synthetic organic composition.

Accordingly, it would be a benefit to the art if a chemical treating agent could be synthesized, which is not susceptible to the above problems. In addition, it would be an advantage to devise a method of preserving certain organic materials susceptible to degradative microorganism attack, and be able to apply this one treatment to a whole spectrum of organic materials used in widely diversified industries.

Therefore, it becomes an object of the invention to provide chemical preservatives for various organic materials, and methods for treating these materials.

A further object is to provide unique chemicals which inhibit or prevent microorganisms attack on organic nutrients, but nevertheless are non-injurious to the human organism.

Still another object is to provide a treatment which can be applied to a great number of organic nutrients susceptible to microbiological attack, and still not adversely affect either the organic nutrient or the base product to which it is subsequently added.

Yet another object is to provide a method of preservation of organic materials dispersed or solubilized in aqueous systems under a wide variety of conditions of light, heat, pH, etc.

A still further object is to provide novel compositions which will provide spoilage protection to industries which vary widely in the scope of their activities.

Another object is to provide non-odoriferous chemicals useful as preservatives, and methods of employing same which when used either alone or in a formulation with prerequisite solubility characteristics so as to be compatible with many aqueous systems to be treated and protected.

A more specific object is to provide chemical preservatives and the methods of protecting organic materials such as proteins, carbohydrates, and synthetic organic materials such as addition or condensation polymers which are stored for a considerable time prior to their incorporation into cellulosic fibrous materials such as paper.

Another specific object is the incorporation of preservatives into paint in order to afford adequate protection over long periods of time and under a wide variety of environmental conditions.

Still another object is the synthesis of a multi-purpose class of chemicals which may be easily applied to an aqueous system to be inhibited from chemical deterioration, with relatively little toxicity hazard to the operator of such system and with limited resort to combinations with other treating agents.

Another object is to provide and furnish new chemicals which may be used to effectively treat fluid aqueous systems at low, economical dosages.

Other objects will appear hereinafter.

In accordance with the invention it has been discovered that the control and inhibition of the growth and reproduction of microorganisms in static systems which contain an organic water-dispersible fermentable nutrient susceptible to deterioration from said microorganisms, may be effected by the incorporation therein of an organic poly-halogenated ester corresponding to the type formula:

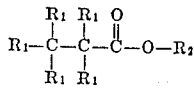

where $R_1$ is selected from the group consisting of lower alkyl, halogen and hydrogen and $R_2$ is a hydrocarbon radical containing from 1 to 6 carbons. It is necessary that at least two occurrences of $R_1$ are halogen. Preferably, the organic polyhalogenated ester is an alkyl polyhalogenated ester. By the term "lower alkyl" is meant a hydrocarbon containing from 1 to 6 carbon atoms and, preferably, from 1 to 3 carbon atoms. The most preferred alkyl group is methyl. The carbon atoms need not necessarily be arranged in a straight chain configuration but may also have branched hydrocarbon radicals proceeding from the main chain.

While any polyhalogenated alkyl substituent of the ester may be usefully employed in the invention, the more preferred materials are those which contain bromine as the halogen constituent. The most preferred polybromo esters are those in which two occurrences of $R_1$ are bromine. These include compounds such as methyl 2,3-dibromopropionate and methyl 2,3-dibromo-2-methyl propionate. Of these, the most desirable compound is methyl 2,3-dibromopropionate from the standpoint of low cost, manufacturing ease and excellent handling properties. While the polybromo esters are preferred, other compounds such as methyl 2,3-dichloropropionate and methyl 2,3-dichloro-2 methyl propionate are also extremely valuable agents.

At least a biostatic amount of the above microbiocidal organic polyhalogenated ester must be added to fermentable nutrients to inhibit their chemical deterioration due to static microbic attack while standing in storage. While the organic polyhalogenated ester is preferably applied to a static aqueous system containing an organic nutrient which is capable of utilization by microbes, its efficiency however, is not limited thereto. Rather it may be effectively used over a broad spectrum of systems susceptible to chemical break-down or spoilage due to microorganisms.

Also, while any organic water-dispersible nutrient susceptible to ferementation by microorganisms may be effectively preserved from deterioration by adding at least a toxic amount of the microbiocidal polyhalogenated ester, it has been determined that the particular organic substances most effectively protected are those selected from the group consisting of proteins, carbohydrates, and synthetic organic compounds. Of the latter, synthetic organic polymers are envisioned as being most suitably inhibited from chemical deterioration.

By the term "static microbic attack" as defined in the invention, is meant utilization and break-down of certain susceptible organic nutrients by microorganisms in their life cycle, as it takes place in a system which is substantially quiescent as opposed to a recirculating, continuous flow or agitated system. Ordinarily this attack or degradation by the microorganisms takes place in an aqueous system which is being held under conditions of storage. Generally the degradation of the nutrient and subsequent created problems are accelerated under conditions of high huimidity and increased temperature. Particularly, the problem of preserving becomes more difficult at temperatures above about 40° F. and more specifically above 60° F. In moist, hot climates preservation from spoilage becomes a most difficult problem.

By the term "fermentable nutrient" is meant a substance capable of chemical change brought about by the action of an enzyme or ferment. The microorganisms may change the nutrients whereby they are simplified chemically. This is normally done by catalytic agents produced by the organisms whether said catalytic agent is associated with the living microorganism or separated from it. Broadly speaking then, the invention encompasses the concept whereby the organic matter is attacked and broken down in some manner by a wide variety of microorganisms.

Microbic attack is effected by a host of bacteria, fungi, and yeasts. Among these are such bacteria as *Pseudomonas aeruginosa, Aerobacter cloacae, Streptococcus faecalis, Bacillus pumilus, Micrococcus pyogenes, Bacillus subtilis, Aerobacter aerogenes, Bacillus mycoides, Desulfovibrio desulfuricans,* and fungi such as *Penicillium glaucum,* Cephalosporium, *Aspergillus terreus,* Trichoderma and *Aspergillus niger.*

The compositions of the invention protect a wide variety of organic nutrients and particularly proteins, carbohydrates and synthetic organic polymers. Among those protected are corn starch, potato starch, dextrin, polysaccharides, maltose, and simple sugars. Chemical break-down of other substances such as casein, soya protein, zein, animal and fish glues, albumen, and blood proteins is also inhibited. In addition, such synthetic organic polymers as methyl cellulose, polyvinyl acetate, sodium carboxymethyl cellulose, polyacrylamide, polystyrene, polyvinyl chloride, polyvinylidene chloride copolymers, styrenebutadiene copolymers, acrylonitrile-butadiene copolymers, acrylates and acrylic polymers may be prevented from spoiling due to microbiological attack through the use of the polyhalogenated organic esters.

Also, grains such as malt, barley etc., or inorganic substances such as clays and alum which contain contaminating amounts of nutrients sufficient to promote microorganism growth may be protected.

In effect then, almost any organic substance and particularly carbohydrates, proteins or synthetic organic materials susceptible to degradation may be suitably preserved. Additives such as those used in coating and sizing of paper or substances used to impart suitable properties to paints, plastics, rubber latex, leather, etc., may be protected from degradative effects of microorganisms. For example, organic additives such as starch may be protected when used as a drilling mud additive. Various organic modifiers in the adhesive industry or those used in acoustical tile, joint cement for plastic board and dried cement for board, have been protected by using the compositions of the invention.

The method of incorporating the polyhalogenated esters into the system to be protected is simple and merely involves their addition either as a 100% active ingredient or contained in a solution or suspension formulation, in an amount at least sufficient to render the microorganisms in the system ineffective. The amount of microbiocidal agent depends upon the particular system, but normally there is required at least one p.p.m. of the organic polyhalogenated ester, this amount being based on the total weight of the system which contains the nutrients susceptible to attack. Depending upon the severity of the problem, amounts varying up to 25,000 p.p.m. may be required. In warm moist climates even more chemical reagent may be required to impart the requisite toxic effect upon the microorganisms in a given system.

With regard to the particular action of the organic polyhalogenated compositions for the purposes of the invention, no distinction is made between their killing action or growth-arresting action. Either type or both types of action may take place depending upon the conditions of the environment to be treated and the severity of the problem. However, in any case, the polyhalogenated esters act as toxic agents toward bacteria, fungi, and yeasts.

A number of the polyhalogenated esters used in the invention are not particularly dispersible or soluble in aqueous media, and therefore it is expedient and a preferred practice of the invention to disperse or solubilize them in various solvents. In addition, these same formulations may contain other components such as emulsifiers. Useful emulsifiers include sulfonated non-ionics, polyoxyalkylene ethers and their derivatives, and sulfonated oils. Blends of the above in any proportion may also be employed. $C_6$–$C_{22}$ alkenyl succinic anhydrides or their alkali metal salts or such materials as ethoxylated and/or propoxylated fatty-substituted amines which contain from 3 to 15 mols of ethylene oxide are also useful emulsifiers.

A wide variety of organic solvents may be employed. Selection may be made from among alcohols, aliphatic hydrocarbons, aroxyl compounds, alkoxyl compounds, and alkaryl solvents. Desirable solvents are those containing aromatic groups such as petroleum aromatic solvents, xylene, toluene, or benzene. The most preferable solvents for the active ingredients, the polyhalogenated esters, are aliphatic hydrocarbons containing at least 5 carbon atoms and preferably from 6 to 12 carbon atoms.

A preferred general liquid formulation containing an aliphatic hydrocarbon solvent with excellent stability and handling properties is listed in Table I below.

TABLE I

| Ingredient: | Percent range by weight |
|---|---|
| (1) Polyhalogenated alkyl ester | 10–50 |
| (2) Aliphatic hydrocarbon solvent | 89.9–42 |
| (3) Emulsifier | 0.1–8 |

A typical formulation of the general type outlined in Table I contains 30% of methyl, 2,3-dibromopropionate, 66% of a mixture of aliphatic hydrocarbons containing from eight to eleven carbons, and 4% Emcol H–300–X emulsifier, a blend of polyoxyethylene ethers and oil sulfonates produced by Witco Chemical Company.

Table II below lists the physical properties of a typical aliphatic hydrocarbon listed under the trade name of Bronoco #365 Solvent.

TABLE II

Physical characteristics:
| | |
|---|---|
| Gravity, API, at 60° F. | 48–50°. |
| Gallon weight, pounds | 6.49–6.56#. |
| Color | Water white. |
| Doctor | Sweet. |
| Corrosion | Negative. |
| Flash point, Tag closed cup | 100° F. min. |
| K. butanol value | 34 cc. min. |
| Distillation, °F.— | |
|   I.B.P. | 310–320. |
|   50 | 320–330. |
|   95 | 350–360. |
| Dry end point, A.S.T.M. e.p. | 360–375. |
| Recovery | 98%. |
| Cloud point | Clear at —36° F. |
| Pour point | Fluid at —36° F. |
| Viscosity at 60° F. | 2.6 cps. |
| P.M.C.C. | 89° F. |
| COC | 126° F. |
| Fire point | 126° F. |

Table III shows the useful ranges of another typical formulation involving an active microbiocide solubilized by heavy petroleum aromatic oil and maintained by an emulsifier.

TABLE III

| Ingredient: | Percent range by weight |
|---|---|
| (1) Polyhalogenated alkyl ester | 10–50 |
| (2) Heavy aromatic petroleum type oil | 89.9–42 |
| (3) Emulsifier | 0.1–8 |

A preferred formulation contains 30% by weight of methyl, 2,3-dibromopropionate, 68% heavy aromatic oil and 2% of an emulsifier, Toximul 500, a sulfonated nonionic blend produced by Stepan Chemical Company. These three components are easily and safely mixed in any sequence and the resulting product is a clear amber liquid which may be easily applied to the system to be treated. The physical properties of this formulation are listed in Table IV below:

TABLE IV

Physical properties:
| | |
|---|---|
| Specific gravity | 1.102–1.111. |
| Flash point, COC | Greater than 120° F. |
| Color | Clear amber. |
| Odor | Aromatic. |
| pH, 1% in deionized water | 4.5. |
| Solubility | Dispersible in water. |
| Free stability | No crystals at 10° F. |
| Solvent type | Non-aqueous. |
| Temperature stability | Stable at 130° F. for 6 months. |
| Drum corrosivity | Shipment in double-lined drums. |

The materials of the invention are quite frequently soluble at use concentrations in industrial process water systems so that chemical briquette absorbents such as soda ash, dextrine and the like may be used to prepare solid materials for feeding with conventional briquette feeding equipment.

Any well-known method of addition of halogen to the appropriate starting materials may be employed to obtain the polyhalogenated organic esters. However, a particularly useful method involves the addition of halogen across a single or multi double-bonded starting material to obtain the dihalogenated or higher halogenated products depending upon the number of double bonds in the starting material. Generally it is necessary in this reaction to hold the temperature between 30 and 70° C. by the use of a cooling bath because of the rapidity of the reaction and its exothermic character.

One such specific method of the above general type reaction may involve the addition of liquid bromine to methyl acrylate at temperatures from 40 to 80° C. during the course of 3–8 hours. After the addition of bromine it may be desirable to distill out the unreacted liquid methylacrylate. The methyl 2,3-dibromopropionate may be later solutized as recited above. An example of a typical microbiocidal composition, methyl 2,3-dibromopropionate, is described in Example I below.

Example I.—Preparation of methyl 2,3-dibromopropionate 900 grams of methyl acrylate are added to a 3 liter, 3-neck round-bottom flask equipped with a thermometer, mechanical stirrer, and ice-cooling bath. 1645 grams of bromine were added to the methyl acrylate through the use of a separatory funnel. During the course of the reaction the mixture was stirred rapidly. At the beginning rapid addition of bromine was allowed (about 5 ml.) until the temperature within the flask rose to 60° C. This occurred after a period of one minute. The temperature was maintained between 50 and 60° C. by continuous drop-wise addition of bromine until all the bromine was added. During the course of the reaction the bromine color disappeared rapidly upon its addition. However, after addition of approximately 80% of the bromine the brownish-red color of bromine persisted inside the flask. The total reaction time required was approximately 30 minutes. The resulting solution was then refluxed through the use of a heating mantle for a period of six hours. During this time some discoloration of the solution was apparent. The reflux temperature was maintained between 70 and 85° C.

EVALUATION OF THE INVENTION

In order to determine the efficacy of the invention for preserving various types of organic nutrients under a wide variety of conditions and environmental media, the following tests were run. Methyl 2,3-dibromopropionate was the particular chemical preservative treating agent used unless otherwise indicated. The dosages, as indicated in the examples, are based on the total weight of the particular system studied.

Example II

A 25% concentrated suspension of pork gelatin was freshly prepared according to manufacturer's specifications. To this was added a sporeforming bacterium and a Pseudomonas strain to accelerate the microbiological break-down. The tests were carried out in a capped two-ounce bottle at a temperature of 98° F.

The results as listed in Table V below show the effective inhibition of bacterial growth by the methyl 2,3-dibromopropionate ester. For control purposes the preserved sample was compared to a sample of gelatin which had not previously been treated with preservative.

TABLE V

| Sample | Odor | | | Consistency | | |
|---|---|---|---|---|---|---|
| | 7 days | 14 days | 21 days | 7 days | 14 days | 21 days |
| Treated pork gelatin: | | | | | | |
| 500* | None | None | None | Solid | Solid | Solid. |
| 1,000* | do | do | do | do | do | Do. |
| Control | Slightly off | Putrefactive | Putrefactive | Surface liquefaction. | 50% liquefaction. | 75% liquefaction. |

*P.p.m. chemical.

It can readily be seen that the pork gelatin treated with the particular polyhalogenated ester remained substantially odor-free over a total time of 21 days. In addition, the consistency of the gelatin remained constant, showing virtually no biological degradative break-down of the gelatin nutrient. On the other hand the control sample became increasingly worse with regard to its odor and consistency, and after 21 days was extremely odoriferous and almost liquid in its consistency.

Example III

In this test a 3% aqueous solution of corn starch was prepared by dissolving the solid starch powder in tap water at 200° F. The same type of bacterial attack was applied in this example as in Example I.

Table VI below shows that the sample containing methyl 2,3-dibromopropionate treating agent maintained excellent odor and consistency, while the control sample quickly was degraded due to utilization of the starch molecules by the bacteria contained within the aqueous dispersion.

TABLE VI

| Sample | Odor | | | Consistency | | |
|---|---|---|---|---|---|---|
| | 7 days | 14 days | 21 days | 7 days | 14 days | 21 days |
| Treated corn starch: | | | | | | |
| 500* | Clean | Clean | Clean | Semisolid | Semisolid | Semisolid. |
| 1,000* | do | do | do | do | do | Do. |
| Control | Off | Off | Off | Liquid | Liquid | Liquid. |

*P.p.m. chemical.

Example IV

This example was run exactly as outlined in Example I with the exception that a 15% solution of dextrin was prepared.

Again, results show that the treating agent maintained the sample during the entire test in its original physical form, and also, prevented any odor whatsoever from arising during the course of the test.

TABLE VII

| Sample | Odor | | | Consistency | | |
|---|---|---|---|---|---|---|
| | 7 days | 14 days | 21 days | 7 days | 14 days | 21 days |
| Dextrin: | | | | | | |
| 500* | Clean | Clean | Clean | Semisolid | Semisolid | Semisolid. |
| 1,000* | do | do | do | do | do | Do. |
| Control | Off | Off | Off | Partial liquefaction. | Liquefaction | Liquefaction. |

*P.p.m. chemical.

Example V

This test involves the testing of the preservative action of methyl 2,3-dibromopropionate upon a sample of 15% concentrated aqueous protein. Again excellent control was effected through the use of the polyhalogenated organic ester employed.

TABLE VIII

| Sample | Odor | | | Consistency | | |
|---|---|---|---|---|---|---|
| | 7 days | 14 days | 21 days | 7 days | 14 days | 21 days |
| Protein: | | | | | | |
| 500* | Strong ammonia. | Strong ammonia. | Strong ammonia. | Liquid | Liquid | Liquid. |
| 1,000* | do | do | do | do | do | Do. |
| Control | Slightly off | Off | Off | Viscous Liquid. | Semisolid | Semisolid |

*P.p.m. chemical.

Example VI

This test involves the investigation of the preservative action of methyl 2,3-dibromopropionate with regard to starch under more severe conditions than previously run. In this example a known starch degrading organism, *Bacillus subtilis*, was added to a cool, freshly prepared starch solution containing 3% starch powder.

After seven days the starch solution containing 15 p.p.m. of the polyhalogenated ester, maintained its original physical appearance and did not give off any odor whatsoever during this period of time. In addition, bacterial counts were taken initially and after the seven day period. The treated sample showed little increase while the control showed more than a ten-fold increase in bacteria, whose growth was favorably increased in the receptive environment of the non-controlled starch solution.

Table IX below gives the results:

TABLE IX

| Sample | Physical appearance | Odor | Initial bacteria count | Final bacteria count |
|---|---|---|---|---|
| Treated starch | Viscous | None | $1 \times 10^6$ | $9 \times 10^6$ |
| Control | Watery | Sour | $1 \times 10^6$ | $3.9 \times 10^7$ |

Example VII

This example illustrates the versatility of the polyhalogenated organic esters with regard to their wide scope of protective use. An interior latex-emulsion paint containing approximately 7% protein solution was mixed with about 2% methyl 1,2-dibromopropionate. A portion of this same latex-emulsion paint was also left untreated. The two samples were then stored for a long period of time, each being investigated monthly as to odor and consistency. After one year the sample containing the preservative maintained its proper ammoniacal odor and uniform consistency. However, on the other hand, the untreated sample developed a very pungent odor after about three weeks. In addition, the untreated sample became non-uniform in part, a viscous semi-solid.

Example VIII

As has been mentioned above, not only completely organic systems are susceptible to degradative microbiological attack when existing in a static condition, but, also inorganic systems may be subject to the same type of attack, if they contain at least minor portions of contaminant nutrients sufficient to sustain bacterial growth and life. The organic material may not only be derived from contamination, but may also be added as a necessary element to the inorganic solution. For example, organic stabilizers are frequently employed to maintain proper control of relatively concentrated inorganic solutions.

In this example, two samples of a 12% alum solution were prepared. Into both samples was added an inoculum from a previous sample of alum which had been stored, and had subsequently become infected. One sample contained 10 p.p.m. of methyl 2,3-dibromopropionate. The other sample was run as a control. In both samples the test temperature was maintained at 86° F., and the storage test period was two weeks.

After this period of time the treated sample showed no fungal growth. The control, on the other hand, showed excessive, visible fungal growth, and a microbiological analysis of the control showed it to be infected with both fungi and yeasts.

The above test shows that in some cases only very minimal amounts of preserving agent can be employed and still give effective control.

Example IX

In this example methyl 2,3-dibromopropionate was employed as a preservative for a sample of an acrylic emulsion. These emulsions find extensive use as synthetic binders for pigments in coating paper and paper board. In addition, these products find wide use as a binder for pigments in water-based paints.

A sample of acrylic resin containing 46% total solids and having a pH of 9.4 was treated with 50 p.p.m. of methyl 2,3-dibromopropionate based on the total weight of the system and stored at 98° F. A control sample containing no preservative was also run under the same conditions. After one month the control sample showed a considerable drop in pH and developed an obnoxious odor. There was also some break-down with regard to product consistency. On the other hand, the treated sample remained stable, showed no drop in pH and developed no odor whatsoever.

Example X

The further versatility of the polyhalogenated organic preservatives is illustrated in this example. In the germination of barley in a normal malting process, many undesirable bacteria deevlop and thrive. These can cause serious problems.

When the malting process is carried out in the presence of methyl 2,3-dibromopropionate good bacterial control is effected with obviation of odor problems, pH, and consistency or stability.

Example XI

The use of clay solutions or slurries as fillers in the paper industry has long caused a problem with regard to storage of same. Bacterial attack with subsequent putrefaction occurs in a relatively short time upon storage of these aqueous systems.

It has been observed that clay slurries may be suitably protected by additions of from 10 p.p.m. to 1,000 p.p.m. of the polyhalogenated organic esters of the invention, and particularly methyl 2,3-dibromopropionate. Using these materials the clay slurries are protected under static conditions of storage and remain free from objectionable odors and/or loss of uniformity of product.

In order to compare the compositions of the invention with other halogenated compounds, the activity of the polyhalogenated organic esters were tested in conjunction with other representative compositions. Two test methods were used involving the species of bacteria and of fungi which normally cause trouble in aqueous systems under conditions of storage. These test methods are set forth in detail below:

TEST METHOD.—GAS TUBE AND GROWTH INHIBITION

In this test the culture medium used consisted of 24 grams of dextrose, 1 gram of Basaminbact (Anheuser Busch), added to one liter of Chicago tap water and sterilized by autoclaving under 25 pounds of pressure for 15 minutes. The final pH of the autoclaved medium was $6.8 \pm 0.1$. An appropriate amount of 18 to 24 hour nutrient broth culture of $A.$ $aerogenes$ or spore suspension of $A.$ $niger$ was mixed with 200 ml. of the culture medium immediately before starting tests, to give an inoculated culture medium having one million organisms per ml. of medium. This inoculated culture medium was placed in each of a series of fermentation tubes with caps which contained the appropriate concentration of test chemical to give a final volume of test chemical and culture medium of 20 ml. in each tube. For this purpose the maximum volume of chemical introduced should be 0.5 ml. per tube to avoid chemical-solvent interference. Many solvent carriers of active materials are themselves somewhat effective, and efficient comparative testing requires that only small amounts of these solvents be introudced into the culture medium. The chemical and the inoculated medium were mixed gently. Two control tests were also run, one in which the chemical was omitted, and the second in the absence of inoculum. In mixing, tubes were inverted in the $A.$ $aerogenes$ gas inhibition study so as to fill the gas detection vials. The $A.$ $niger$ fungal growth inhibition study tubes were shaken. Inhibition ranges for $A.$ $aerogenes$ were determined by noting the presence or absence of gas production in the gas vials after 48 hours incubation of tubes at 90° F. The $A.$ $niger$ test tubes were incubated for 5 days at 30° C. and inhibition levels were determined by noting presence or absence of growth in the tubes at the end of this period of time.

Using the above described chemical synthesis and test method of inhibition several typical compositions of the invention were prepared and their activity determined. The activity of compositions of the invention was directly compared with that of other haloalkyl esters. Results are reported as parts of chemical treating agent necessary to effectively inhibit one million microorganisms. These results are set forth in Table X.

TABLE X.—MICROBIOLOGICAL ACTIVITY OF HALOGENATED ESTERS—INHIBITION RESULTS

| Composition | Name and structure | Inhibition results (p.p.m.)* | |
| --- | --- | --- | --- |
| | | Aa+ 48 hr. inhibition | An++ 5 day inhibition |
| I | N-lauryl bromoacetate $$BrCH_2-\overset{O}{\underset{\|}{C}}-C_{12}H_{25}$$ | 500–1000 | 200–500 |
| II | 1,3-dibromo isopropylacetate $$CH_3\overset{O}{\underset{\|}{C}}-O-\underset{\underset{CH_2Br}{\|}}{\overset{\overset{CH_2Br}{\|}}{CH}}$$ | 100–200 | 100–200 |
| III | Methyl 2,3-dichloropropionate $$CH_2ClCHCl-\overset{O}{\underset{\|}{C}}-O-CH_3$$ | 10–25 | 5–10 |
| IV | 1,3-dichloroisopropylacetate $$CH_3\overset{O}{\underset{\|}{C}}-O-\underset{\underset{CH_2Cl}{\|}}{\overset{\overset{CH_2Cl}{\|}}{CH}}$$ | 200–500 | 200–500 |
| V | Methyl trichloroacetate $$Cl_3C-\overset{O}{\underset{\|}{C}}-OCH_3$$ | 200–500 | 500–1000 |

See footnotes at end of table.

TABLE X.—MICROBIOLOGICAL ACTIVITY OF HALOGENATED ESTERS — INHIBITION RESULTS—Continued

| Composition | Name and structure | Inhibition results (p.p.m.)* | |
| --- | --- | --- | --- |
| | | Aa+ 48 hr. inhibition | An++ 5 day inhibition |
| VI | Methyl dichloroacetate $Cl_2CHC(=O)-O-CH_3$ | 200–500 | 200–500 |
| VII | Methyl 2,3-dibromopropionate $BrCH_2CHBrC(=O)-O-CH_3$ | 2.5–5 | 1–2.5 |
| VIII | Ethyl 2,3-dibromopropionate $BrCH_2CHBrC(=O)-O-CH_2CH_3$ | 10–25 | 1–2.5 |
| IX | Ethyl-2-bromopropionate $CH_3CHBrC(=O)-O-CH_2CH_3$ | 50–100 | 25–50 |
| X | Ethyl-2-bromo-n-butyrate $CH_3CH_2CHBr-C(=O)-O-CH_2CH_3$ | 200–500 | 100–200 |
| XI | Ethyl-3-bromohexanoate $CH_3CH_2CH_2CHBrCH_2C(=O)-O-CH_2CH_3$ | 500–1000 | 100–200 |
| XII | Methyl 2,3-dibromo-2-methyl propionate $CH_2BrC(CH_3)(Br)-C(=O)-O-CH_3$ | 10–25 | 10–25 |
| XIII | O-chlorophenyl phenyl chloroacetate (Ph-CHCl-C(=O)-O-C₆H₄Cl) | 100–200 | 10–25 |
| XIV | Diethyl bromomalonate $(H,Br)C(-C(=O)-O-CH_2CH_3)_2$ | 200 | 5–1 |
| XV | Diethyl 1,2-dibromo succinate $CH_3CH_2-O-C(=O)BrCH-CHBrC(=O)-OCH_2CH_3$ | 100 | 5–10 |
| XVI | Methyl-3-bromo-propionate $BrCH_2CH_2C(=O)-OCH_3$ | >100 | >100 |
| XVII | Ethyl-3-bromo propionate $BrCH_2CH_2C(=O)-OCH_2CH_3$ | >100 | >100 |
| XVIII | Methyl-3-bromo n-butyrate $CH_3CH_2CHBrC(=O)-O-CH_3$ | >100 | >100 |

Aa+=Aerobacter aerogenes. An++=Aspergillus niger.
*P.p.m.=Parts of test chemical per one million microorganisms.

A close examination of Table X shows that those compounds with halogens both alpha (2) and beta (3) to the ester group are clearly superior to any other halogenated esters. These compositions, namely, Compositions III, VIII, XII and VII, may be essential skeleton structure as follows:

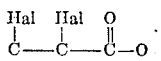

Several points must be noted with regard to Table X. First, while the compositions of the invention broadly comprise polyhalo type esters it is desirable that the halogen atoms be adjacent to each other rather than occur on the same carbon atom as in Compositions V and VI. Also, it is to be noted that when the portion of the ester molecule formed from an alcoholic moiety is halogenated, for example, in Compositions II and IV the activity is considerably lower than in the case where the acid part of the molecule has been at least dihalogenated, such as is contemplated in the composition of the invention. Again, when the carbon content of the alcoholic portion of the halogenated ester becomes too high such as in Composition I, where the alcoholic portion of the ester contain 12 carbon atoms, considerable decrease in activity is noted. As has been described above, it is preferred that the alcoholic portion of the ester contain from 1 to 6 carbon atoms.

Compositions IX, X, XI, and XVI–XVIII each only contain one halogen and show considerably less activity than the analogous compounds of the invention which have, as an essential part of their structure, adjacent halogens on separate carbon atoms.

In addition to the 48 hour inhibition test for *Aerobacter aerogenes* and 5 day inhibition test of *Aspergillus niger*, which results are tabulated in Table X, microbiological activity of methyl 2,3-dibromopropionate was also determined and compared with certain monohalogenated alkyl esters with regard to 1 and 24 hour killing ranges. As indicated in the above test method an appropriate amount of 18 to 24 hour nutrient broth culture of *A. aerogenes* or spore suspension of *A. niger* was mixed with 200 milliliters of culture medium so as to give an inoculated culture medium having 1 million organisms per milliliter of culture medium. This inoculated culture medium was then added to tubes containing appropriate amounts of test chemicals, the total final volume of test chemical and culture medium being 20 milliliters in each tube. The maximum amount of test chemical introduced was 0.5 milliliter per tube to avoid test chemical-solvent interference. The inoculated media and test chemical were then mixed gently, i.e., tubes were shaken in the *A. niger* fungal growth inhibition study, and inverted in the *A. aerogenes* inhibition study to fill the gas detection vials. At the end of 1 and 24 hours contact with the test chemicals, portions of the liquid in the test were diluted 1000 fold to stop the chemical action. The diluted samples were then cultured into sterile culture tubes, incubated for 48–72 hours at 30° C. and examined for growth. Results of these tests then indicate the 1 and 24 hour killing ranges.

Table XI below indicates the microbiological activity of methyl, 2,3-dibromopropionate compared to other halo esters with regard to their 1 hour and 24 hour killing effects. Results are reported as parts of chemical treating agent necessary to effectively inhibit one million microorganisms.

TABLE XI.—MICROBIOLOGICAL KILLING ACTIVITY

| Composition | 1 hour kill | | 24 hour kill | |
|---|---|---|---|---|
| | A. aerogenes | A. niger | A. aerogenes | A. niger |
| VII | 100 | 100 | 25–50 | 25–50 |
| XVI | 100 | 100 | 100 | 100 |
| XVII | 100 | 100 | 100 | 100 |
| XVIII | 100 | 100 | 100 | 100 |

Table XI above shows that Composition VII, methyl 2,3-dibromopropionate, has relatively quick killing activity, that is, after 24 hours good bacterial and fungal activity is noted. On the other hand, Compositions XVI–XVIII, all containing only one bromo group show little killing effect even after a 24 hour contact period. The above results are particularly meaningful when the chemical is to be applied to a storage system which is particularly susceptible to microorganism attack, or has already begun to degrade somewhat and requires rapid control. If such control is not quickly established, process reagents are rendered useless and become a total loss.

While it is not fully understood why polyhalogenated and particularly dihalogenated alkyl ester compounds are clearly superior to monohalogenated alkyl esters, it is believed the following theory accounts for the superior microbiological activity.

Microorganisms present in these static systems containing nutrients have a metabolism involving a citric acid cycle. This cycle involves the ingestion and subsequent use of 2-carbon fragments of organic composition. These fragments are produced by the Acetyl Coenzyme A produced by the microorganisms which later combines with this same enzyme. The enzymatic molecule condenses in turn to form citric acid. Citric acid is then transformed in the cycle itself to useful metabolic nutrients and by-products. Since the particular treating agent would therefore be utilized in 2-carbon segments with the ester group generally being the dividing line of the microbiological attack, there is a high probability that one of the two-carbon segments will include both halogen atoms in the segment. These atoms in turn will be introduced into the system of the microorganism with subsequent destructive or inhibitive results therein.

The ineffectiveness of the monohalogenated esters is believed to be due to the ability of the particulr microorganisms involved to detoxify by various known mechanisms the two-carbon segments containing only a monohalogen constituent.

In conclusion, it has been shown that the organic polyhalogenated esters and particularly alkyl esters exhibit excellent bacterial, fungal, and yeast control with regard to systems under storage. This is especially true of aqueous systems which are highly susceptible to degradative break-down by these same microorganisms. Excellent preservative action has been shown over a broad spectrum of systems involving organic nutrients utilizable in microorganism life processes.

What we claim is:
1. A composition substantially inhibited from chemical deterioration due to static microbic attack, which comprises an organic water-dispersible fermentable microorganism nutrient susceptible to said deterioration and at least a biostatic amount of a microbiocidal organic polyhalogenated ester of the formula:

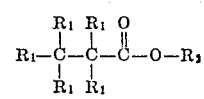

where $R_1$ is selected from the group consisting of lower alkyl, halogen and hydrogen and $R_2$ is a hydrocarbon radical containing from 1 to 6 carbons with the proviso that at least two occurrences of $R_1$ are halogen.

2. A composition substantially inhibited from chemical deterioration due to static microbic attack, which comprises an organic water-dispersible fermentable microorganism nutrient from the group consisting of proteins, carbohydrates and synthetic organic polymers susceptible to said deterioration and at least 1.0 p.p.m. of an alkyl polyhalogenated ester, said amount based on the total weight of a system containing said nutrient, said ester being of the formula:

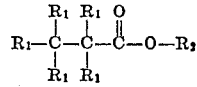

where $R_1$ is selected from the group consisting of lower alkyl, halogen and hydrogen, and $R_2$ is an aliphatic hydrocarbon radical containing from 1 to 6 carbons with the proviso that at least two occurrences of $R_1$ are halogen.

3. The composition of claim 2 where the alkyl polyhalogenated ester is methyl 2,3-dibromopropionate.

4. A composition substantially inhibited from chemical deterioration due to static microbic attack which comprises an organic water-dispersible fermentable paper additive susceptible to said deterioration and at least 1.0 p.p.m. of an alkyl polyhalogenated ester, said amount based on the total weight of a system containing said nutrient, said ester being of the formula:

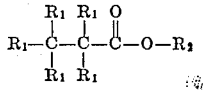

where $R_1$ is selected from the group consisting of lower alkyl, halogen and hydrogen and $R_2$ is an aliphatic hydrocarbon radical containing from 1 to 6 carbons with the proviso that at least two occurrences of $R_1$ are halogen.

5. A composition substantially inhibited from chemical deterioration due to static microbic attack which comprises an organic water-dispersible fermentable paper additive from the group consisting of proteins, carbohydrates and synthetic organic polymers susceptible to said deterioration and at least 1.0 p.p.m. of an alkyl polyhalogenated ester, said amount based on the total weight of a system containing said nutrient, said ester being of the formula:

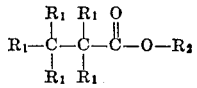

where $R_1$ is selected from the group consisting of lower alkyl, halogen and hydrogen, and $R_2$ is an aliphatic hydrocarbon radical containing from 1 to 6 carbons with the proviso that at least two occurrences of $R_1$ are halogen.

6. A composition substantially inhibited from chemical deterioration due to static microbic attack which comprises an organic water-dispersible fermentable paper additive selected from the group consisting of carbohydrates, proteins and synthetic organic polymers, which are susceptible to said deterioration and at least 1.0 p.p.m. of methyl 2,3-dibromopropionate, said amount based on the total weight of a system containing said nutrient.

7. The composition of claim 6 where the paper additive is starch.

8. The composition of claim 6 where the paper additive is casein.

9. The composition of claim 6 where the paper additive is animal glue.

10. The composition of claim 6 where the paper additive is a styrene-butadiene copolymer.

11. The method of substantially inhibiting chemical deterioration of organic water-dispersible micro-organism nutrients susceptible to static microbic attack which comprises the step of adding to said nutrient at least a biotoxic amount of a microbiocidal organic polyhalogenated ester of the formula:

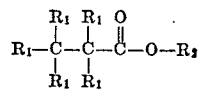

where $R_1$ is

UNITED STATES PATENT OFFICE
CERTIFICATE OF CORRECTION

Patent No. 3,181,992                                        May 4, 1965

Raymond J. Michalski et al.

It is hereby certified that error appears in the above numbered patent requiring correction and that the said Letters Patent should read as corrected below.

Column 1, line 36, for "wich" read -- which --; column 3, line 13, for "microorganisms" read -- microorganism --; column 4, line 16, for "valuable agents" read -- valuable treating agents --; line 28, for "ferementation" read -- fermentation --; column 11, line 9, for "deevlop" read -- develop --; columns 13 and 14, TABLE X, under the heading An++5 day inhibition, opposite No. XIV, for "5-1" read -- 5-10 --.

Signed and sealed this 26th day of October 1965.

(SEAL)
Attest:

ERNEST W. SWIDER                                       EDWARD J. BRENNER
Attesting Officer                                           Commissioner of Patents